United States Patent [19]

Abe

[11] Patent Number: 5,841,208
[45] Date of Patent: Nov. 24, 1998

[54] MOTOR CAPABLE OF GENERATING AN ELECTRIC SIGNAL HAVING A PARTICULAR AND PRECISE FREQUENCY AND A ROTARY MAGNETIC HEAD APPARATUS USING THE SAME

[75] Inventor: Hiroyuki Abe, Chiba, Japan

[73] Assignee: Sony Corporation, Japan

[21] Appl. No.: 770,905

[22] Filed: Dec. 20, 1996

[30] Foreign Application Priority Data

Dec. 22, 1995 [JP] Japan ................. 7-350644

[51] Int. Cl.$^6$ ................................. H02K 17/00
[52] U.S. Cl. ............... 310/67 R; 310/68 R; 310/DIG. 6; 310/207; 310/171
[58] Field of Search ............... 310/DIG. 6, 67 R, 310/68 R, 207, 168, 171; 324/166, 167, 174

[56] References Cited

U.S. PATENT DOCUMENTS

| | | | |
|---|---|---|---|
| 2,823,545 | 2/1958 | Bodge | 310/164 |
| 4,695,795 | 9/1987 | Nakamizo et al. | 324/208 |
| 4,975,607 | 12/1990 | Hara et al. | 310/67 R |
| 5,126,613 | 6/1992 | Choi | 310/208 |
| 5,260,619 | 11/1993 | Hara | 310/160 |

*Primary Examiner*—Steven L. Stephan
*Assistant Examiner*—Karl Tamai
*Attorney, Agent, or Firm*—Ronald P. Kananen

[57] ABSTRACT

A motor capable of generating an electric signal having a particular and precise frequency may be used in a rotary magnetic head apparatus for a video tape recorder. A wiring pattern for generating the signal is disposed on a stator opposite a rotor. Alternating magnetic flux provided by movement of the rotor produces the signal. Gaps in the wiring pattern allow the wiring pattern and wiring for iron core assemblies also disposed on the stator to be disposed on a single circuit board. A toroidal coupling line and a loop coupling line close the loop without crossing the gaps.

7 Claims, 7 Drawing Sheets

MOTOR CAPABLE OF GENERATING AN ELECTRIC SIGNAL HAVING A PARTICULAR AND PRECISE FREQUENCY AND A ROTARY MAGNETIC HEAD APPARATUS USING THE SAME

FIELD OF THE INVENTION

The present invention relates generally to motor and a rotary magnetic head apparatus driven by the motor. More specifically, the present invention is directed to a motor capable of generating an electric signal having a precise frequency and a rotary magnetic head apparatus such as a video tape recorder driven by the motor.

RELATED ART TO THE INVENTION

FIG. 1 is a cross-sectional view of a rotary magnetic head apparatus equipped with a conventional motor. The rotary magnetic head apparatus of FIG. 1 comprises a rotary drum 100, a stationary or fixed drum 110 and a motor 120. When a magnetic tape (not shown) is fed to or wound on the rotary drum 100, a signal recorded on the magnetic tape may be reproduced by the magnetic head 101, or a signal may be recorded on the magnetic tape by the magnetic head 101.

The motor 120 comprises a motor rotor 121 and a motor stator 122. The motor rotor 121 is integrally formed with a shaft 123. The rotary drum 100 is also integrally formed with the shaft. As a result, rotations of the motor rotor 121 are transferred by the shaft 123 to the rotary drum 100 when motor 120 is operated to drive the motor rotor 121. Thus, the rotary drum 100 is rotated with respect to the stationary drum 110.

The motor stator 122 comprises a plurality of iron core assemblies 126 which are disposed substantially in a circle on the motor stator 122. Each iron core assembly 126 comprises a coil 124 and an iron core 125 on which the coil 124 is wound. A circuit board 127 (FIG. 2), having a wiring pattern for generating an electric signal having a particular frequency, and an integrated circuit for driving the motor 120 are disposed on the stator above the motor rotor 121.

FIG. 2 is a plan view showing an example of a wiring pattern 130 for generating an electric signal having a particular and precise frequency. The wiring pattern 130 is fabricated on the circuit board 127.

The wiring pattern 130 comprises a plurality of signal generating line elements 131 which are substantially radially aligned around the circumference of the substantially disk-shaped circuit board 127. The signal generating line elements are connected to each other by connecting line elements 132.

The connecting line elements 132 are aligned circumferentially around the circumference of the substantially disk-shaped circuit board 127 such that, alternately, the inner or outer end of a signal generating line element 131 is connected by a connecting line element 132 to the corresponding inner or outer end of an adjacent signal generating line element 131. The result is a tooth-shaped pattern around substantially the entire perimeter of the circuit board 127 as shown in FIG. 2.

Referring again to FIG. 1, the wiring pattern 130 for generating an electric signal having a particular frequency is located on the motor stator 122 opposite to a magneto 128 which is disposed around the inside circumference of the motor rotor 121. The magneto 128 comprises a series of alternately magnetized portions, i.e. N-poles and S-poles are alternately disposed around the circumference of the magneto 128. These alternately magnetized portions are formed on the upper surface 129 of the magneto 128.

When the coils 124 of the iron core assemblies 126 are energized within the motor 120, the motor rotor 121 and the magneto 128 rotate with respect to the motor stator 122 and the wiring pattern 130. As the magnetic flux from the alternating N-poles and the S-poles of the magnetized surface 129 of the magneto 128 sweeps in and out of the toothed loop made by the signal generating line elements 131, the connecting line elements 132 and a toroidal coupling line 132a, a voltage is induced and a consequent electric signal is generated having a particular frequency. The signal is induced in the line comprised of the signal generating line elements 131, the connecting line elements 132 and the toroidal coupling line 132a.

As noted, the iron core assemblies 126 are disposed on, i.e. connected to, the motor stator 122. The iron core assemblies 126 are connected to the stator inside the wiring pattern 130, but must be electrically driven so as to operate the motor 120. Accordingly, there must be a gap 133 in the wiring pattern 130 so that the wiring pattern 130 does not completely encircle the perimeter of the circuit board 127. Wiring for connecting to and driving the iron core assemblies 126 is then disposed on the circuit board 127 through the gap 133 in the wiring pattern 130.

This gap 133 in the wiring pattern 130 is essential if the wiring pattern 130 and electrical connections to the iron core assemblies 126 are to be disposed on the same circuit board 127. The alternative, i.e. not disposing the wiring pattern 130 and the connections to the iron core assemblies 126 on the same circuit board 127, would result in a device which is much more difficult and expensive to manufacture.

As illustrated in FIG. 2 and as previously mentioned, to preserve a complete loop made by the signal generating line elements 131 and the connecting line 132, despite the gap 133, a toroidal connecting line 132a is disposed to electrically connect the signal generating line element 131a on one side of break 133 to the signal generating line element 131b located on the opposite side of the gap 133.

This configuration, as shown in FIG. 2, allows a gap 133 to be provided in the wiring pattern 130 and maintains a closed loop comprised of signal generating line elements 131, connecting line elements 132 and the toroidal connecting line 132a. According to the principles of induction, an electric signal may then be produced by varying the magnetic flux passing through this closed loop, as occurs with the rotation of the alternately magnetized magneto 128. However, this configuration cannot generate an electric signal with a particular frequency with sufficient precision.

The degradation of frequency precision arises because voltages induced in the connecting line elements 132 cannot be cancelled to zero when integrated around the entire circumference of a wiring pattern 130 which includes the gap 133 as described above. As the circuit pattern 130 is designed, these induced voltages in the connecting line elements 132 do not contribute to the desired frequency of the signal being generated. Accordingly, they must be completely cancelled to zero to ensure the precision of the frequency of the resulting signal.

The unwanted voltage signal components in the connecting line elements 132 which are not canceled by circumferential integration may be induced by off-center (eccentric) arrangements between the motor rotor 121 and the wiring pattern 130, or by magnetic flux produced by the iron core assemblies 126 during operation of the motor 120.

This problem has been addressed in the prior art by a method illustrated in FIGS. 3 and 4. FIG. 3 is a plan view showing a modification to the wiring pattern for generating a signal having particular and precise frequency.

As shown generally in FIG. 3 and, in more detail in FIG. 4, two gaps are provided in a modified wiring pattern 140. These gaps are created by removing two connecting line elements of the wiring pattern 140. This creates gaps 142a and 142d in the wiring pattern 140 between signal generating line elements 141a and 141b, and between 141c and 141d, as shown in FIGS. 3 and 4.

To close the loop around the circuit board made by the signal generating and the connecting line elements, jumper lines 143 are provided across the gaps 142a and 142d. These jumper lines 143 are not formed directly on the circuit board 127 as are the signal generating line elements, the connecting line elements and the electrical wiring passing through gaps 142a and 142d to the iron core assemblies 126. Instead, the jumper lines 143 pass over the electrical wiring which runs through gaps 142a and 142d in order to electrically connect signal generating line elements 141a and 141b with each other, and to connect signal generating line elements 141c and 141d with each other.

The jumper lines 143 cause the gaps 142a and 142d to have no effect on the closed loop of the wiring pattern 140. Consequently, the voltages induced in the connecting line elements by either the off-center relationship between the motor rotor 121 and the wiring pattern 140, or by magnetic flux from the iron core assemblies 126 are completely canceled when integrated around the entire circumference of the wiring pattern 140, including the jumper lines 134. Accordingly, a signal having a precise and particular frequency can be generated. However, as mentioned above, the jumper lines 143 are not formed on the circuit board 127 with all the other circuitry including the connections to the iron core assemblies and the signal generating and connecting line elements. The jumper lines 143 must be added to the circuit board 127 manually. This increases the time and expense required to manufacture the device shown in FIGS. 3 and 4.

Accordingly, there is a need for a motor which can produce a particular frequency with great precision which is less costly and time-consuming to manufacture.

SUMMARY OF THE INVENTION

It is an object of the present invention to meet the above-described need. It is an object of the present invention to provide a low-cost motor capable of producing an electric signal with a high precision frequency, and also a rotary magnetic head apparatus equipped with such a motor.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may comprise:

a rotor which rotates;

a stator;

a magneto disposed on the rotor having alternately magnetized portions around a circumference thereof for creating a changing magnetic field when the rotor rotates; and a wiring pattern disposed on the stator opposite the magneto, wherein the signal is generated in the wiring pattern;

wherein the wiring pattern has a substantially square wave shape extending along a substantially circular line with two gaps therein; and further wherein the wiring pattern is an electric path formed in a closed loop with no part of the electric path traversing the gaps.

The present invention may also include a plurality of magnetic field generators disposed on the stator inside the wiring pattern, wherein some of the alternately magnetized portions of the magneto drive the rotor in response to the magnetic field generators;

wherein wiring is provided to the magnetic field generators through the gaps in the wiring pattern; and wherein the wiring pattern and the wiring provided to the magnetic field generators is disposed on a single circuit board.

The wiring pattern of the present invention may comprise:

a plurality of signal generating line elements disposed in radial directions relative to a center of rotation of the rotor;

a plurality of connecting line elements disposed along a direction of rotation of the rotor;

wherein an inner or outer end of a signal generating line element is connected by a connecting line element to a corresponding inner or outer end of an adjacent signal generating line element, but leaving the two gaps mentioned above in the substantially circular shape;

a toroidal coupling line connecting signal generating line elements at the two outermost edges of the gaps; and a loop coupling line connected between the toroidal coupling line and signal generating line elements located between the gaps;

wherein a point at which the loop coupling line connects to the toroidal coupling line is a point at which the magnetic field generators in one direction are connected to wiring passing through one of the gaps and the magnetic field generators in another direction are connected to wiring passing through another of the gaps.

The present invention also comprises a method of generating an electric signal having a frequency comprising the steps of:

providing a wiring pattern;

providing, as a part of the wiring pattern, a plurality of signal generating line elements and a plurality of connecting line elements wherein some of the signal generating line elements are connected to each other by the connecting line elements to form a single continuous line;

providing, as a further part of the wiring pattern, a first coupling line for connecting a first end of the single continuous line to a second end of the single continuous line, and a second coupling line branching from the first coupling line to connect to those of the signal generating elements not included in the single continuous line such that a closed loop forming an electric path is formed by the signal generating line elements, the connecting line elements and the first and second coupling lines;

providing a changing magnetic field within the closed loop to generate the signal.

BRIEF DESCRIPTION OF THE DRAWINGS

The accompanying drawings illustrate the present invention and are a part of the specification. Together with the following description, the drawings demonstrate and explain the principles of the present invention. In the drawings.

DETAILED DESCRIPTION OF THE PREFERRED EMBODIMENTS

Figure 1:
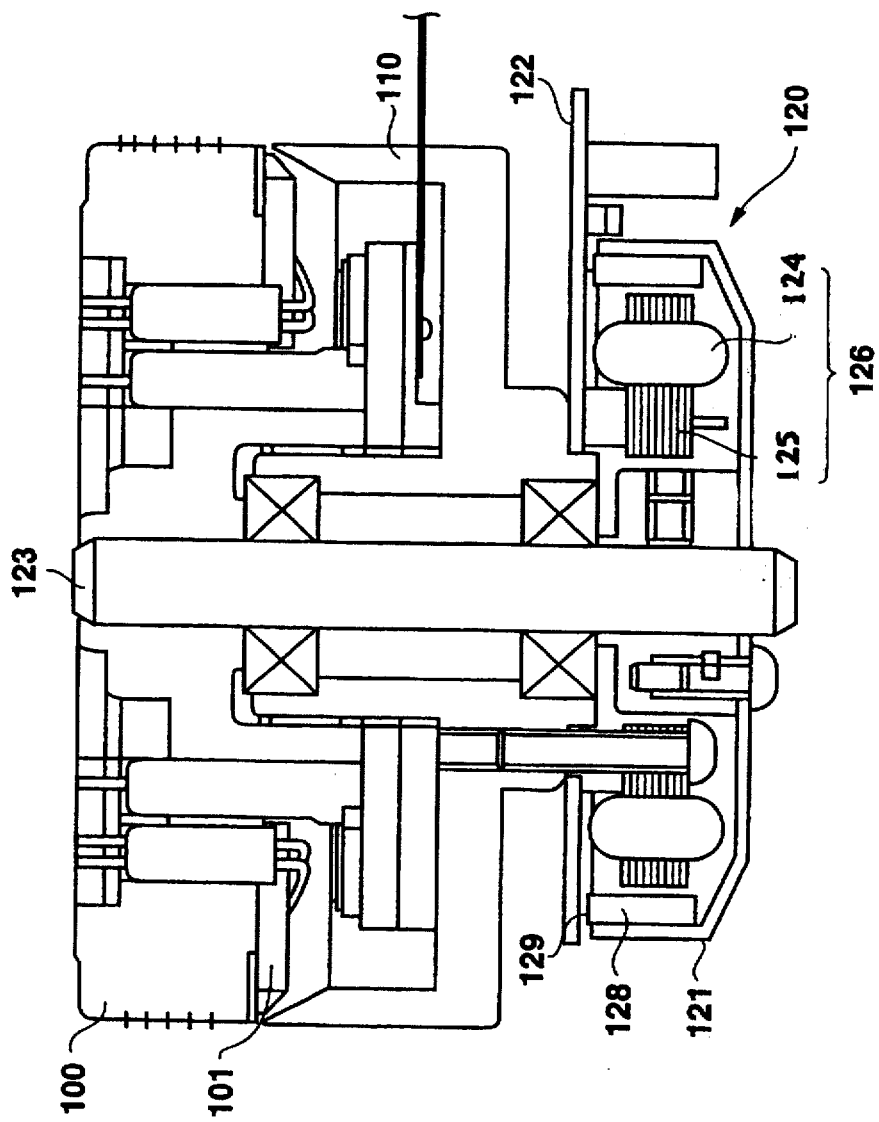
FIG. 1 is a sectional view showing a rotary magnetic head apparatus equipped with a motor.
Figure 2:
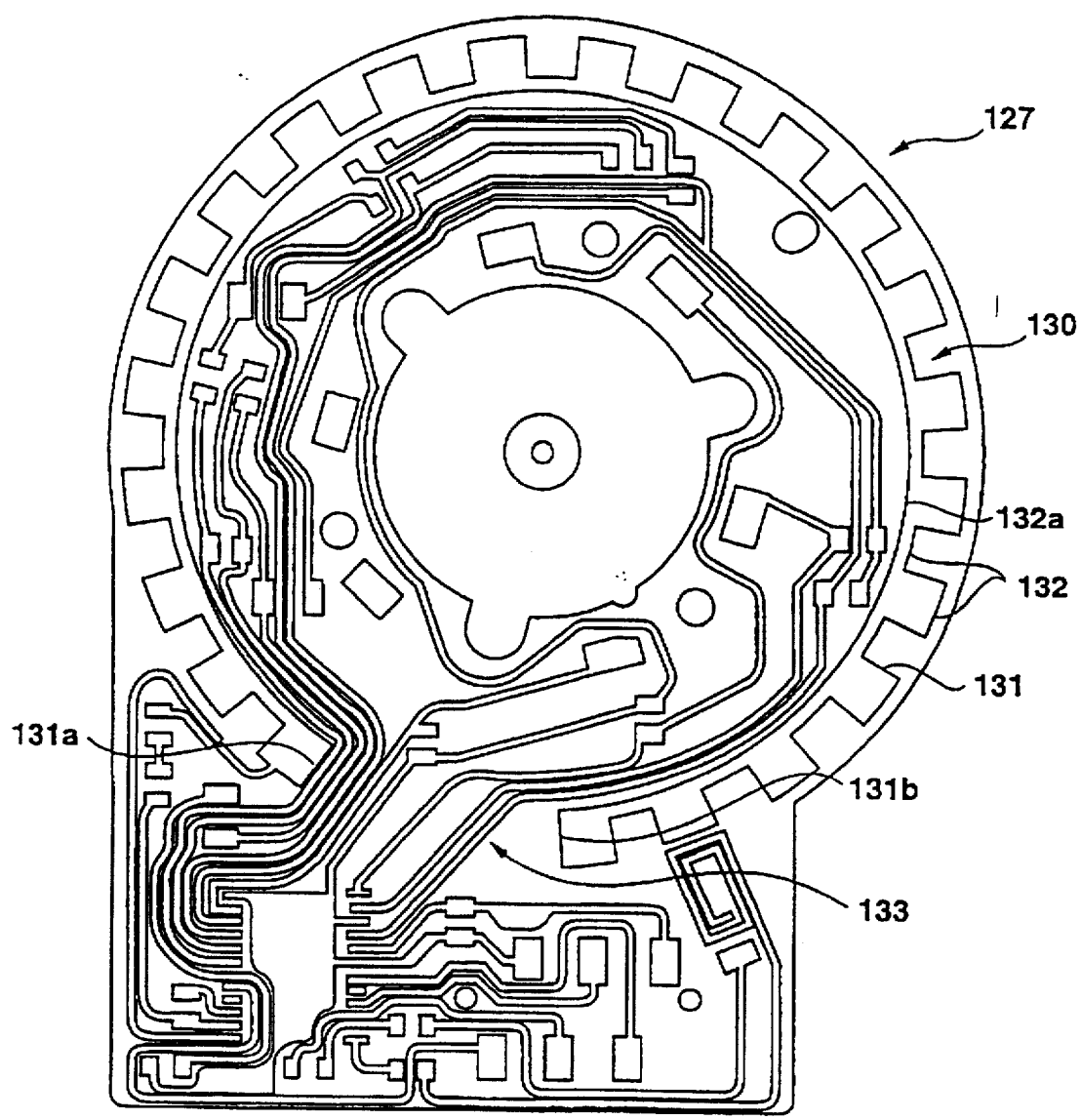
FIG. 2 is a plan view showing an example of a wiring pattern for generating a signal with a particular frequency which could be employed with the motor shown in FIG. 1.

Referring now to the drawings, various preferred embodiments of the present invention will be described in detail.

Figure 5A:
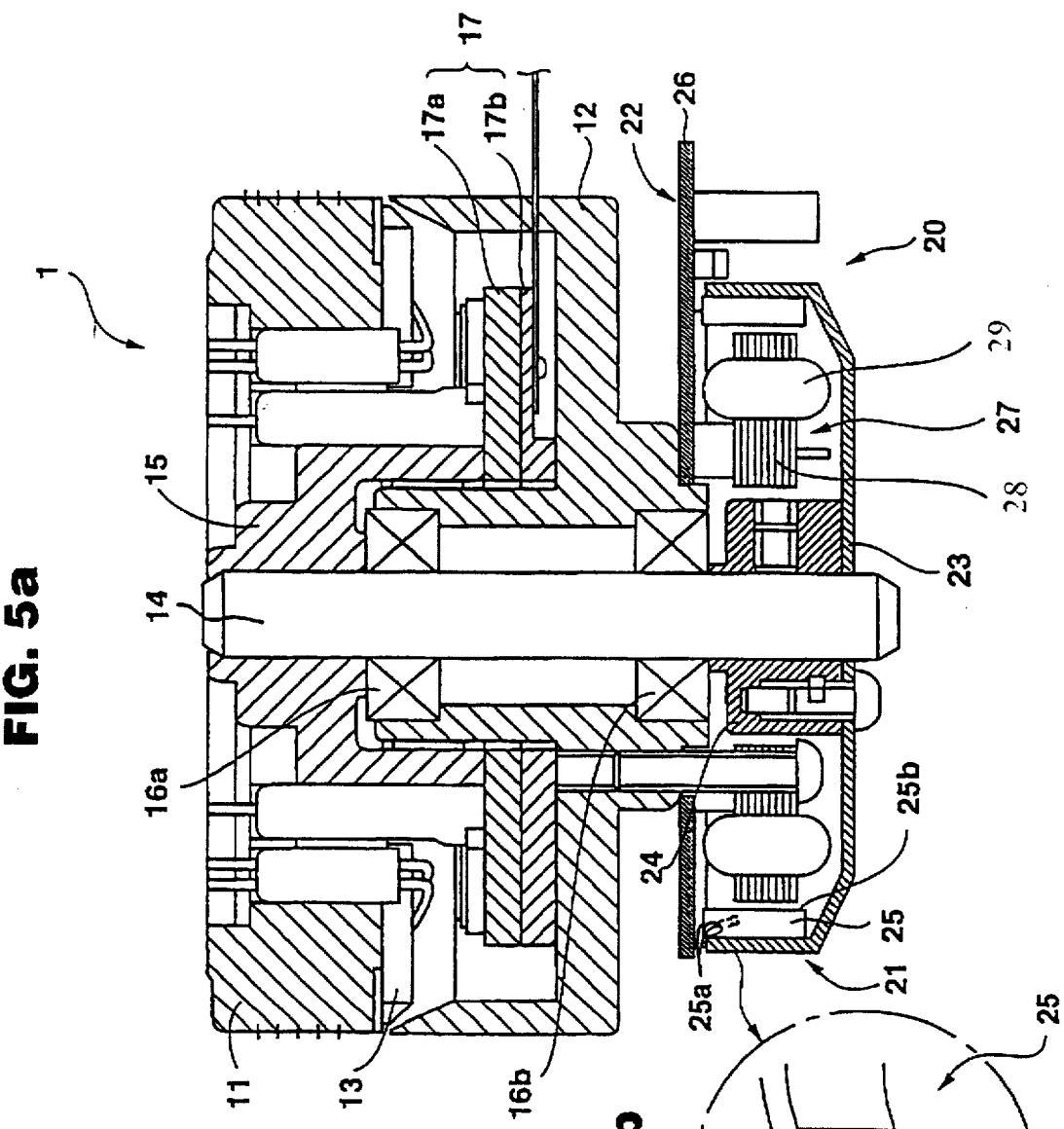
FIG. 5 is a sectional view showing a rotary magnetic head apparatus of equipped with a motor according to an embodiment of the present invention.
Figure 5B:
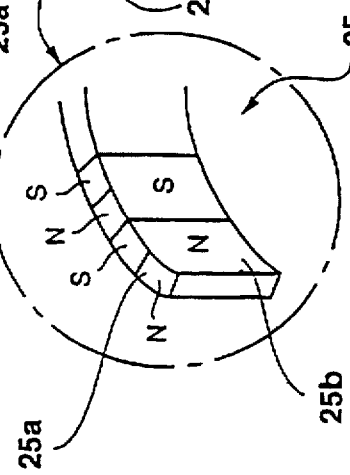

FIG. 5 is a sectional view showing a rotary magnetic head apparatus and a motor according to a preferred embodiment of the present invention.

The rotary magnetic head apparatus 1 comprises an upper rotary drum 11, a lower stationary drum 12 and a motor 20. When a magnetic tape, such as a video tape, is wound on the rotary drum 11, the rotary drum 11 rotates so that a signal may recorded on the magnetic tape or reproduced from the magnetic tape by a magnetic head 13.

The rotary drum 11 is fixed on a flange 15. The flange 15 is also fixed to a shaft 14 by, for example, the shrinkage fitting process. A single magnetic head 13 or a plurality of heads are fixed on the lower surface of the rotary drum 11.

The stationary drum 12 contains bearings 16a and 16b for rotatably supporting the shaft 14. The stationary drum 12 also comprises a loading portion (not shown in detail). The loading portion guides the lower edge of the magnetic tape while the magnetic tape is being transported.

A rotary transformer 17 comprises a rotor core 17a fixed on a lower portion of the flange 15. A ring-shaped coil is arranged on the rotor core 17a of the rotary transformer 17. A second ring-shaped coil is arranged on the stator core 17b.

When an information signal stored on the magnetic tape is reproduced by the magnetic head 13, the rotor core 17a and the stator core 17b may transfer this signal in a non-contact manner. Accordingly, the ring-shaped coil of the rotor core 17a is connected to the magnetic head 13, and the ring-shaped coil of the stator core 17b is connected to, for instance, an externally provided signal processing unit.

The motor 20 comprises a motor rotor 21 and a motor stator 22. The motor rotor 21 has a rotor yoke 23, a ring 24, and a magneto 25. The motor stator 22 has a stator board 26 and a plurality of iron core assemblies 27 fixed on the stator board 26 which act as magnetic field generators.

The stator board 26, for example, may be a metal board, e.g. an iron plate. If an iron plate is used, the stator board 26 may function as a back yoke by forming a magnetic path.

In the present exemplary embodiment, there are eight iron core assemblies 27. Each iron core assembly comprises an iron core 28 and a driving coil 29 wound around the iron core 28. The eight iron core assemblies 27 are disposed substantially in a circle around the perimeter of the stator board 26

A wiring pattern 30 for generating an electric signal of a particular frequency is formed around the outer perimeter of the stator board and encircles the circle of iron core assemblies 27.

A magneto 25 have a toroidal shape is disposed around the inner circumference of a rotor yoke 23 of the motor rotor 21. The magneto 25 is positioned opposite the wiring patter 30 for generating a signal having a particular frequency. As shown in FIG. 5, the upper surface of the magneto 25 comprises a plurality of magnetized portions 25a. The magnetized portions 25a are alternately magnetized as N-poles and S-poles around the circumference of the magneto 25.

The magneto 25 also comprises a second series of magnetized portions 25b, also alternately magnetized as N-poles and S-poles. The magnetized portions 25b allow the magneto 25 and the rotor 21 to be driven by the iron core assemblies 27 when the motor 20 is being operated.

When the magneto 25 and rotor 21 are rotated, the magnetic flux of the magnetized portions 25a intersects with the wiring pattern 30 to produce the desired electric signal having a particular frequency as will be described below in greater detail.

Figure 6:
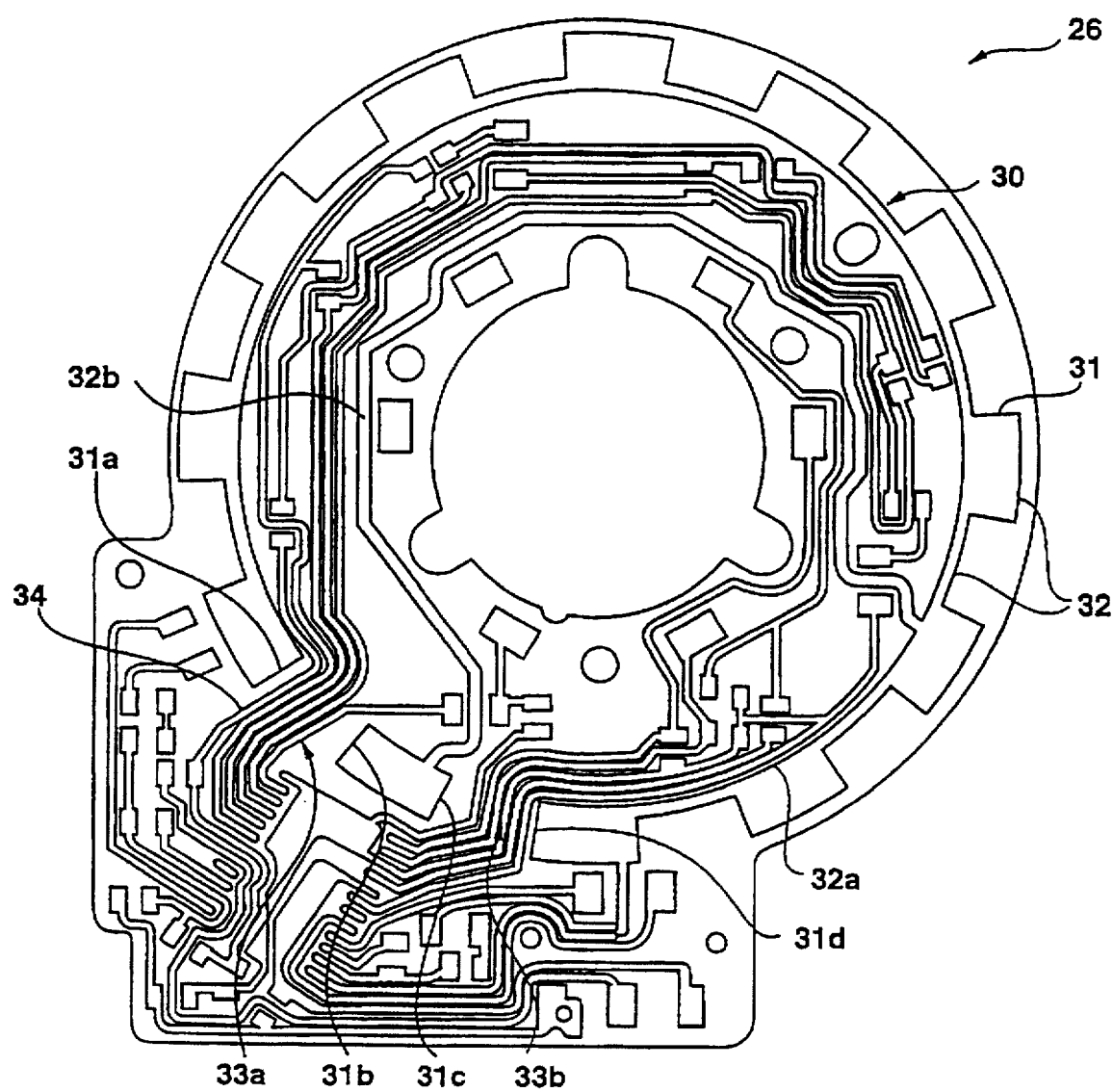
FIG. 6 is a plan view showing an embodiment of the wiring pattern for generating a signal with a particular and precise frequency according the present invention.

FIG. 6 is a plan view showing an example of a signal generating wiring pattern 30 formed on the stator board 26 according to the principles of the present invention for providing a signal of a particular and precise frequency.

The signal generating wiring pattern 30 comprises a plurality of signal generating line elements 31 which are disposed in radial directions around the circumference of a disk-shaped circuit board disposed on the stator board 26.

The connecting line elements 32 are aligned circumferentially around the circumference of the substantially disk-shaped stator board 26 such that, alternately, the inner or outer end of a signal generating line element 31 is connected by a connecting line element 32 to the corresponding inner or outer end of an adjacent signal generating line element 31. The result is a tooth-shaped pattern around substantially the entire perimeter of the stator board 26 as shown in FIG. 6.

However, two successive connecting line elements are omitted to create two gaps 33a and 33b in the wiring pattern 30 between signal generating line elements 31a and 31b and between 31c and 31d. A toroidal coupling line 32a running around the unbroken perimeter of the wiring pattern 30 connects signal generating line elements 31a and 31d.

A loop coupling line 32b branches out from the toroidal coupling line 32a. The loop coupling line 32b connects, in series, the otherwise isolated signal generating line elements 31b and 31c. The loop coupling line 32b then reconnects with the toroidal coupling line 32a.

The point at which the loop coupling line 32b branches from the toroidal coupling line 32a is a point at which wiring for the iron core assemblies 34 in a clockwise direction from the point and wiring for the iron core assemblies 34 in a counter-clockwise direction from the point enter the wiring pattern 30 through different gaps 33a, 33b.

When the gaps 33a and 33b are provided in the signal generating wiring pattern 30, one gap may be formed in such a manner that it is not adversely influenced by the magnetic flux of the driving magnetizing portion 25b, which is caused by employing the other gap. In other words, a selected number of connected line elements are provided in one gap to produce a voltage having one phase, whereas the same number of connecting line elements are provided in the other gap, which may produce another voltage having another phase completely opposite to that of the first-mentioned phase.

Figure 7:
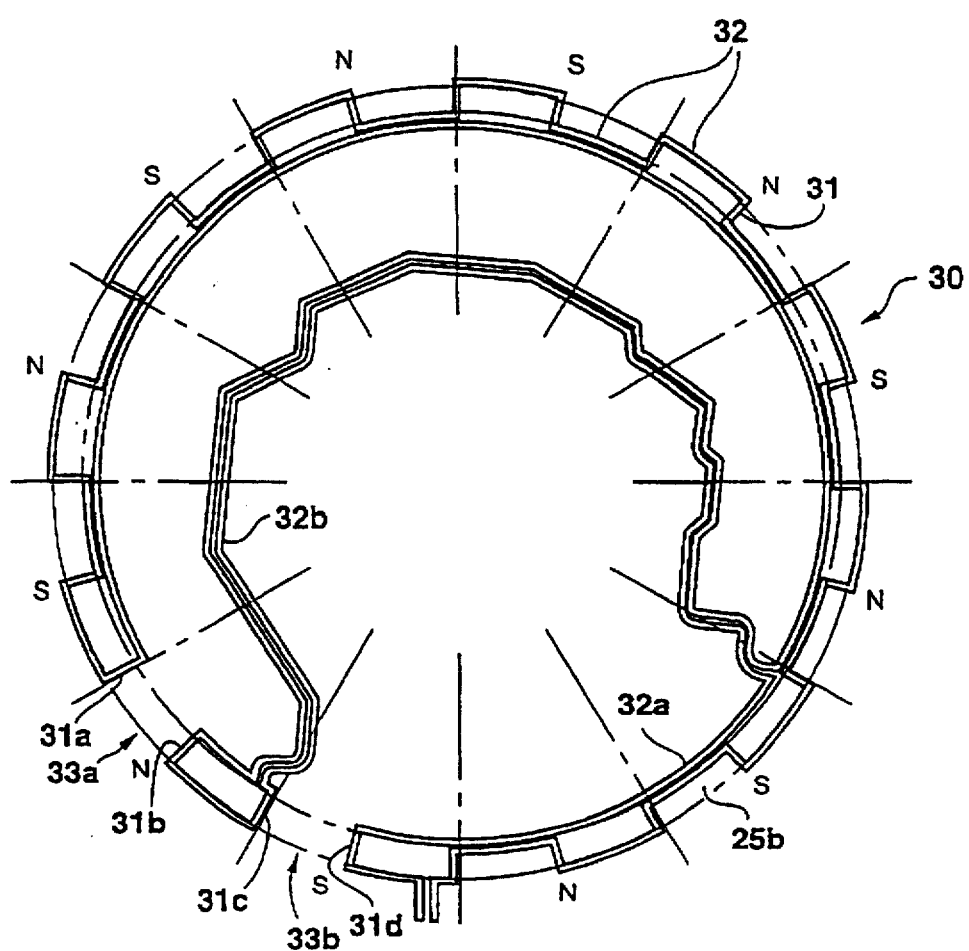
FIG. 7 is a plan view showing a relationship between a wiring pattern of the present invention and the magnetic poles of a magneto.

FIG. 7 is a plan view for schematically showing a relationship between the signal generating wiring pattern 30 and the magnetic poles of the driving magnetizing portion 25b of the magneto 25, shown in FIG. 6.

Due to influences of the magnetic flux produced from this driving magnetizing portion 25b, a voltage is induced in the connecting line elements 32. If there were no gaps in the wiring pattern 30, the voltage induced by the N-pole magnetic flux and the voltage induced by the S-pole magnetic flux could be integrated over the entire circumference of the wiring pattern 30. When so integrated, the total induced voltage cancels to 0. However, because gaps in the wiring pattern 30 must be provided, a connecting line element associated initially with N-pole magnetic flux from the magneto is removed to create one gap 33a and a second connecting line element associated initially with S-pole magnetic flux if removed to create the second gap 33b. As a consequence, the induced voltage by the N-pole magnetic flux and the induced voltage by the S-pole magnetic flux can be set to 0.

Figure 3:
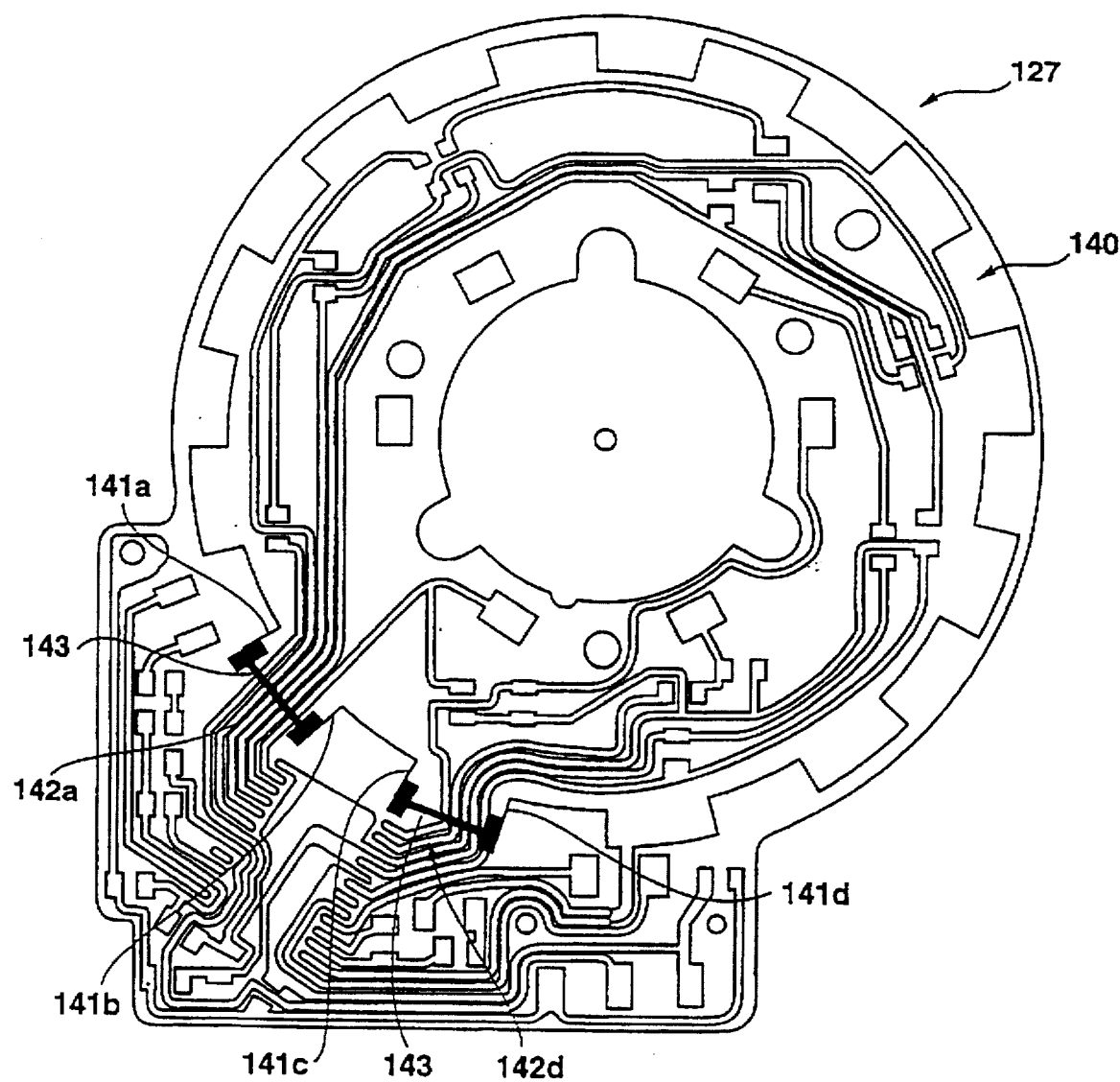
FIG. 3 is a plan view showing an example of a modified wiring pattern for generating a signal with a particular frequency.
Figure 4:
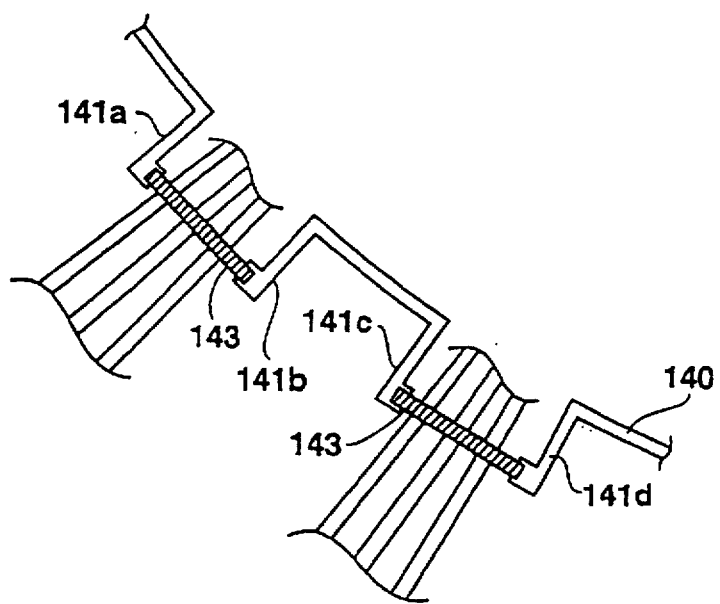
FIG. 4 is a plan view showing an enlarged portion of the wiring pattern shown in FIG. 3.

This embodiment of the present invention, allows a substantial increase in the precision with which the motor can generate an electric signal of a particular frequency without employing the jumper lines 143 shown in FIG. 3. Accordingly the expense of providing the jumper lines, including the additional time and labor required, can be eliminated.

As will be readily apparent to those skilled in the art, the principles of the present invention are not limited to the foregoing embodiment. For example, the motor 20 in the preferred embodiment is illustrated with a wiring pattern located on the circumference of a stator opposite a rotor which is driven by a plurality of iron core assemblies. However, the present invention is not limited to this type of motor, but may be applied to other types of motors. Additionally, the motor described in the foregoing embodiment is used to drive the rotary drum of the rotary magnetic head apparatus used in a video tape recorder. However, motors designed according to the principles of the present invention can be used in any other device in any other field where a motor generating an electric signal of a precise frequency is an advantage.

Thus, the preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A motor for generating an electric signal having a frequency, the motor comprising:

a rotor;

a stator;

a magneto disposed on said rotor, the magneto having alternately magnetized portions around a circumference thereof for creating a changing magnetic field when said rotor rotates;

a wiring pattern disposed on said stator opposite said magneto, wherein said signal is generated in said wiring pattern, said wiring pattern having a substantially square wave shape extending along a substantially circular line and forming two gaps in a spaced relationship along said substantially circular line, and wherein said wiring pattern is an electric path formed as a closed loop with no part of said electric path traversing said gaps.

2. A motor as claimed in claim 1 further comprising a plurality of magnetic field generators disposed on said stator inside said wiring pattern, wherein at least one of said alternately magnetized portions of said magneto cause said rotor to rotate in response to said magnetic field generators.

3. A motor as claimed in claim 2 wherein wiring is provided to said magnetic field generators through said gaps in said wiring pattern.

4. A motor as claimed in claim 3 wherein said wiring pattern and said wiring provided to said magnetic field generators are disposed on a single circuit board.

5. A motor as claimed in claim 3, wherein said wiring pattern comprises:

a plurality of signal generating line elements disposed in radial directions relative to a rotational axis of said rotor;

a plurality of connecting line elements disposed along a rotational direction of said rotor such that an inner or outer end of a signal generating line element is connected by a connecting line element to a corresponding inner or outer end of an adjacent signal generating line element while maintaining said two gaps in said spaced relationship along said substantially circular line;

a toroidal coupling line connecting the signal generating line elements located at the outermost edges of said gaps; and a loop coupling line connected between said toroidal coupling line and the signal generating line elements located between said gaps.

6. A motor as claimed in claim 5, wherein a point at which said loop coupling line connects to said toroidal coupling line is a point at which a magnetic field generator on a first side of said point is connected to wiring passing through one of said gaps and a magnetic field generator on a second side of said point is connected to wiring passing through another of said gaps.

7. A motor as claimed in claim 1, wherein said wiring pattern comprises:

a plurality of signal generating line elements disposed in radial directions relative to a rotational axis of said rotor;

a plurality of connecting line elements disposed along a rotational direction of said rotor such that an inner or outer end of a signal generating line element is connected by a connecting line element to a corresponding inner or outer end of an adjacent signal generating line element while maintaining said two gaps in said spaced relationship along said substantially circular line;

a toroidal coupling line connecting the signal generating line elements located at the outermost edges of said gaps; and a loop coupling line connected between said toroidal coupling line and the signal generating line elements located between said gaps.

* * * * *